United States Patent [19]
Aguilar et al.

[11] Patent Number: 6,017,184
[45] Date of Patent: Jan. 25, 2000

[54] TURBOCHARGER INTEGRATED BEARING SYSTEM

[75] Inventors: Scott Grover Aguilar, La Crescenta; David George Elpern, Los Angeles; Peter John Hebben, Torrance; Lloyd Bill Jensen, Big Bear City; Steven Walter Coleman, Cypress; Sunhil Nandan Sahay, Palos Verdes Estates; Douglas Alan Milliken, Thousand Oaks; Raymond Leo Lopez, Fountain Valley; Werner Wick, Torrance, all of Calif.

[73] Assignee: Allied Signal Inc., Morristown, N.J.

[21] Appl. No.: 09/112,517

[22] Filed: Jul. 9, 1998

Related U.S. Application Data

[60] Provisional application No. 60/054,908, Aug. 6, 1997.

[51] Int. Cl.⁷ .................................................. F01D 11/00
[52] U.S. Cl. .......................... 415/112; 415/111; 415/105; 415/106; 415/107; 415/229; 417/407; 417/365
[58] Field of Search ...................................... 415/111, 112, 415/104, 105, 106, 107, 229; 384/112, 113, 369, 398, 901; 417/407, 365

[56] References Cited

U.S. PATENT DOCUMENTS

| | | |
|---|---|---|
| 3,043,636 | 7/1962 | MacInnes et al. ...................... 308/121 |
| 3,390,926 | 7/1968 | Woollenweber, Jr. ................... 308/122 |
| 3,811,741 | 5/1974 | McInerney et al. ..................... 308/122 |
| 3,941,437 | 3/1976 | MacInnes et al. ....................... 308/121 |
| 4,207,035 | 6/1980 | Perr et al. ................................ 417/407 |
| 4,240,678 | 12/1980 | Sarle et al. ............................. 308/121 |
| 4,256,441 | 3/1981 | Arora ....................................... 417/407 |
| 4,573,808 | 3/1986 | Katayama ............................... 384/114 |
| 4,917,509 | 4/1990 | Takano .................................... 384/275 |
| 5,076,755 | 12/1991 | Okada .................................... 415/17 |
| 5,462,365 | 10/1995 | Brandt ..................................... 384/275 |
| 5,509,738 | 4/1996 | Haynes et al. .......................... 384/275 |
| 5,846,061 | 12/1998 | Ledebuhr et al. .................... 417/477.9 |

*Primary Examiner*—Edward K. Look
*Assistant Examiner*—Ninh Nguyen
*Attorney, Agent, or Firm*—Felix L. Fischer

[57] ABSTRACT

An integrated bearing system with journal and thrust bearings is incorporated in a single unit centrally pinned to the bearing housing and having integral thrust surface and journal surface lubrication grooves in combination with turbine and compressor wheel thrust surfaces. The bearing employs a first aperture substantially equidistant from the ends to engage the locating pin to prevent rotation of the bearing within the bearing case bore, while allowing the bearing to be free to symmetrically wobble within the bearing case bore.

8 Claims, 7 Drawing Sheets

TURBOCHARGER INTEGRATED BEARING SYSTEM

CROSS REFERENCE TO RELATED APPLICATIONS

This application claims the benefit of the filing date of provisional application 60/054,908 having a filing date of Aug. 6, 1997 entitled Integral Bearing Turbocharger.

BACKGROUND OF THE INVENTION

1. Field of the Invention

This invention relates generally to bearings for turbochargers. More particularly, the invention provides an integrated bearing system with journal and thrust bearings incorporated in a single unit centrally pinned to the bearing housing and having integral thrust surface and journal surface lubrication grooves in combination with turbine and compressor wheel thrust surfaces.

2. Description of the Related Art

Exhaust gas driven turbochargers include a rotating shaft carrying turbine wheel and a compressor wheel, which is rotatably supported within a center housing by oil lubricated bearings. The turbine wheel is driven by the exhaust gas at high rotational speeds, often in excess of 100,000 RPM, to drive the compressor wheel to provide boosted charge air for use by an internal combustion engine. Axial motion of the shaft and wheels must be resisted by the bearing system and rotational dynamics of the rotor group accommodated and damped by journal action of the bearing system.

Prior art systems typically employ a pair of journal bearings separately constrained or separated by a central spacer, to achieve desired rotational dynamics. Thrust loads are absorbed through conventional thrust washer or collar and end plate or flange designs, one element of which may be integrated with one of the journal bearings.

It is, therefore, desirable to provide a bearing system employing the minimum number of parts for simplicity. It is also desirable that the number of mating surfaces be reduced in the bearing system to improve normality and ease of balancing. It is further desirable that the bearing maintain angular flexibility to accommodate shaft motion while providing adequate damping. It is additionally desirable that the bearing include an integral pressure fed lubrication capability for thrust and journal surfaces.

SUMMARY OF THE INVENTION

An integrated bearing system for a turbocharger employing the present invention incorporates a center housing including a bearing case bore and a boss with an aperture receiving a locating pin extending into the bearing case bore substantially centrally in the bore. A single piece bearing is received in the bearing case bore and has integral thrust surfaces on opposing ends and integral journal bearing surfaces on portions of the bearing proximate the ends. The bearing further includes an internal bore to receive a shaft extending between a compressor wheel and a turbine wheel, the internal bore having a plurality of axial grooves extending between the thrust surfaces. The bearing additionally includes a first aperture substantially equidistant from the ends and engaging the locating pin to prevent rotation of the bearing within the bearing case bore. This arrangement allows the bearing to be free to symmetrically wobble within the bearing case bore. The bearing further has a second aperture substantially centrally located and in communication with a lubrication oil channel entering the bearing case bore in the center housing. Thrust runners on an end surface of a hub on each of the compressor wheel and turbine wheel engage the thrust surfaces of the bearing.

BRIEF DESCRIPTION OF THE DRAWINGS

The details and features of the present invention will be more clearly understood with respect to the detailed description and drawings in which.

DETAILED DESCRIPTION OF THE INVENTION

Figure 1A:
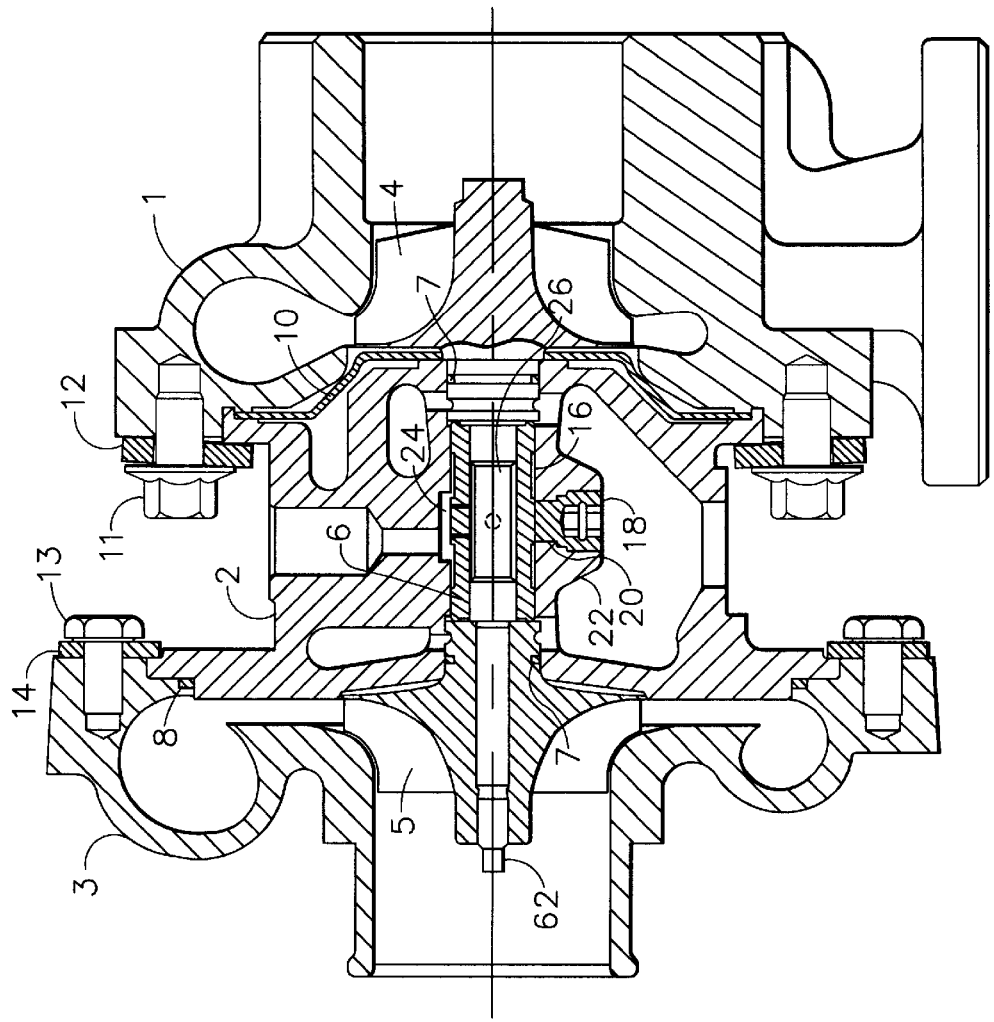
FIG. 1a is a side section view of a turbocharger incorporating a first embodiment of the bearing system of the present invention with direct contact between the thrust surface of the integral bearing and the compressor wheel hub.

Referring to the drawings, a turbocharger incorporating the present invention is shown in FIG. 1a. A turbine housing 1, center housing 2 and compressor housing 3 form the case of the turbocharger. A turbine wheel and shaft assembly 4 are attached to a compressor wheel 5, with the shaft rotationally supported in a bearing 6 carried in the center housing. Piston ring seals 7 on the turbine wheel and compressor wheel hubs prevent lubrication oil leakage from the center housing into the turbine or compressor housings. A compression ring 8 enhances the sealing attachment of the compressor housing to the center housing. A shroud 10 is engaged between the turbine housing and center housing extending behind the turbine wheel as a thermal barrier. Bolts 11 extending through washer clamps 12 secure the turbine housing to the center housing while bolts 13 and washer clamps 14 secure the compressor housing to the center housing.

Bearing 6 is constrained from rotating in the bearing case bore 16 of the center housing by a pin 18 inserted through an aperture 20 in boss 22. The bearing is semi-floating with symmetrical freedom of movement from end to end due to the centrally located pin thereby optimizing the effectiveness of the oil-film damper in the clearance between the bearing outer diameter and case bore. Lubrication for the bearing is supplied through an inlet 24. The shaft extending through the bearing includes a relieved portion 26 promoting oil flow between the shaft and bearing.

Figure 2:
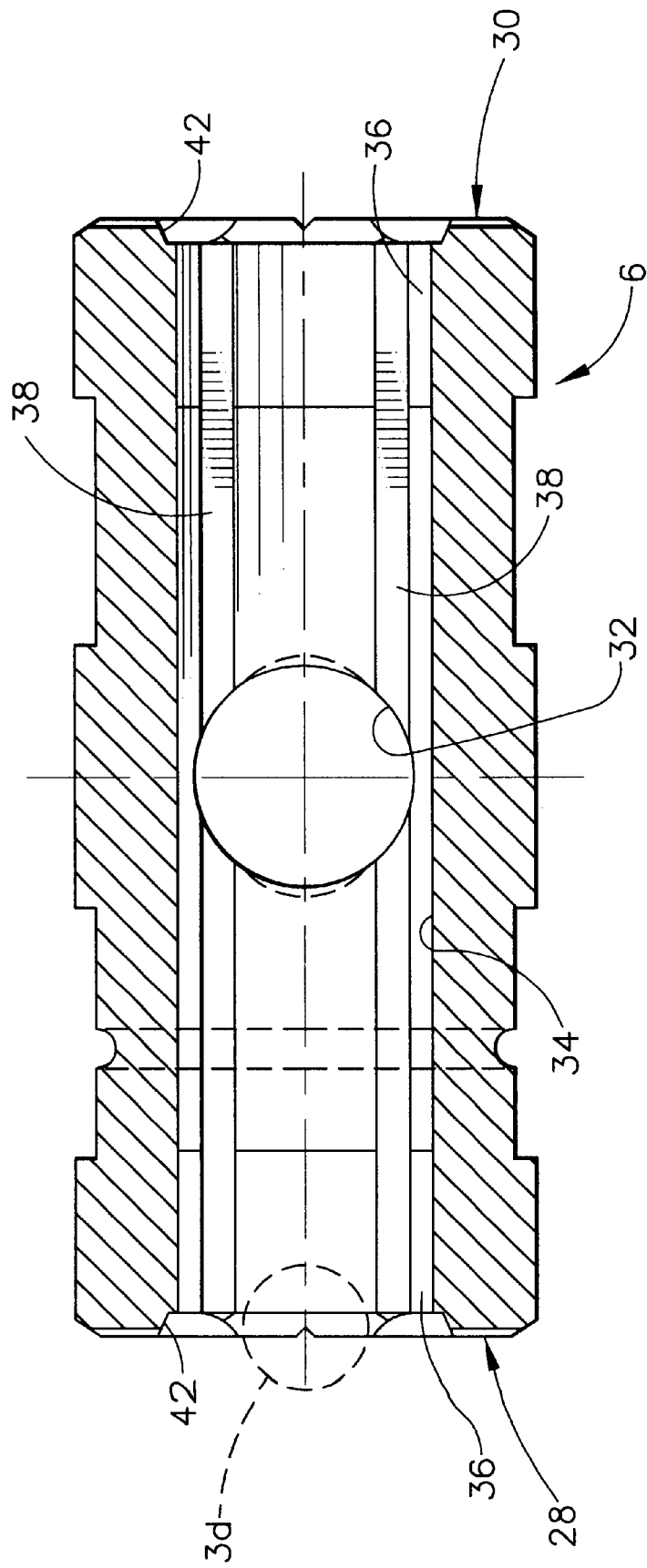
FIG. 2 is a top section detail of the integral journal and thrust bearing unit.

A detailed cross-section of the bearing is shown in FIG. 2. Thrust surfaces 28 and 30 are located at opposite ends of the bearing. The unitary bearing structure provides the minimum parts count and forces maximum parallelism of the thrust surfaces during wobbling action of the bearing. The central location of aperture 32, which receives the locating pin, allows uniform damping action of the bearing ends.

The bore 34 of the bearing extends between the thrust surfaces and incorporates end portions 36 which are characterized by an enhanced surface finish for bearing support of the unrelieved portions of the shaft. Axial grooves 38 extend longitudinally along the bore surface for lubricant flow. The axial grooves additionally provide an enhancement in rotordynamics by improving resistance to subsynchronous shaft motion through reduction of oil whirl encountered in lightly loaded bearing conditions. The bearing as shown in the embodiment disclosed employs a pressure fed lubrication system.

Figure 3A:
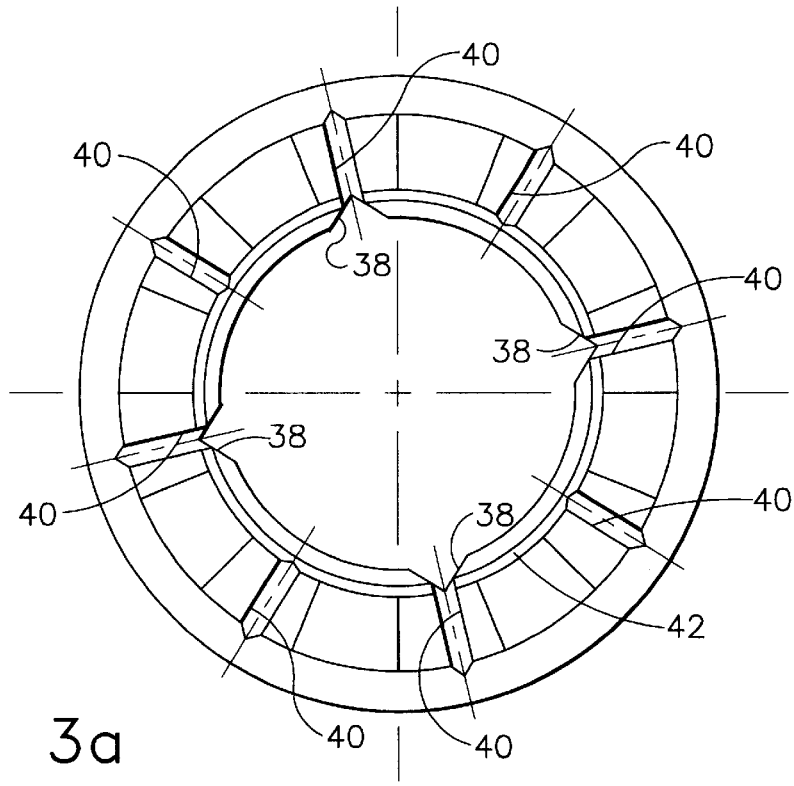
FIG. 3a is an end view of the integral journal and thrust bearing unit.
Figure 3B:
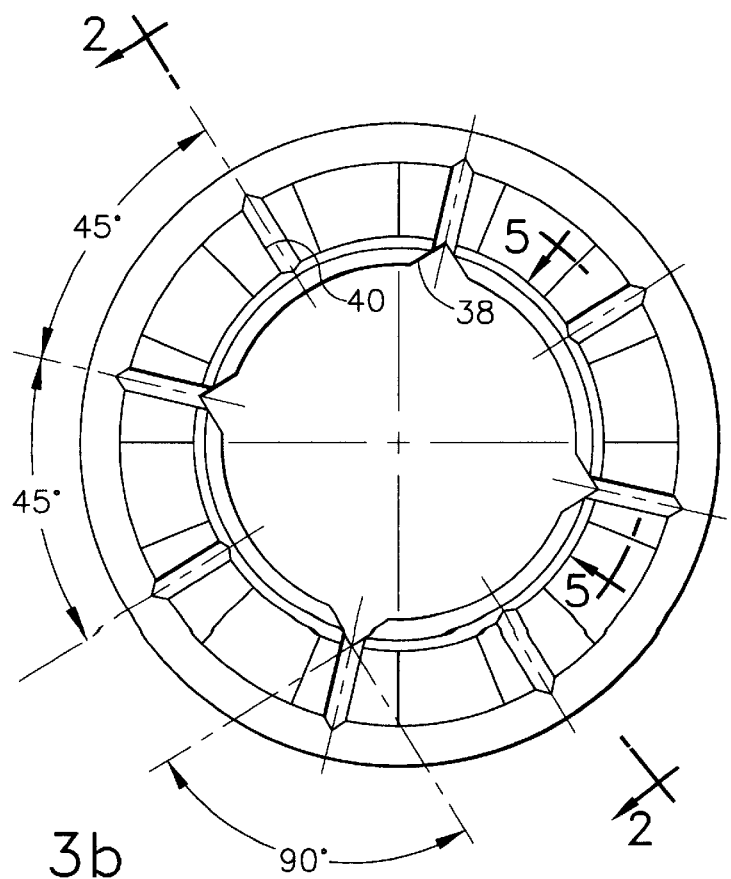
FIG. 3b is the end view of FIG. 3 with geometrical relationship of the elements defined.
Figure 3C:
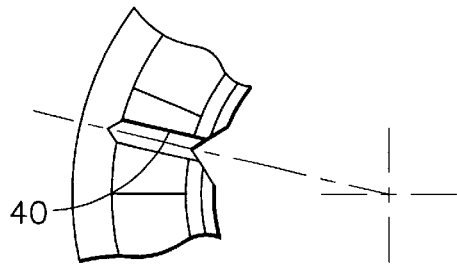
FIG. 3c is a partial view detail of the radial grooves in the thrust surface.
Figure 3D:
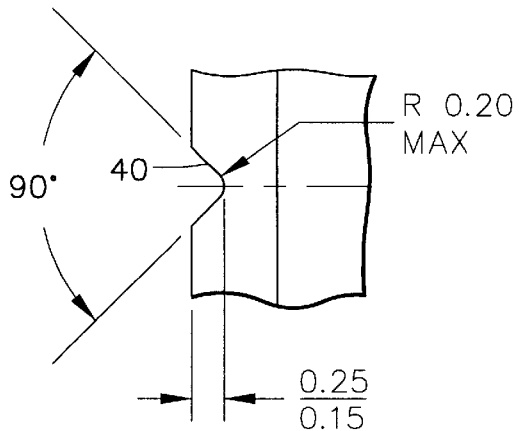
FIG. 3d is a partial view detail of a line 3d in FIG. 2.
Figure 4:
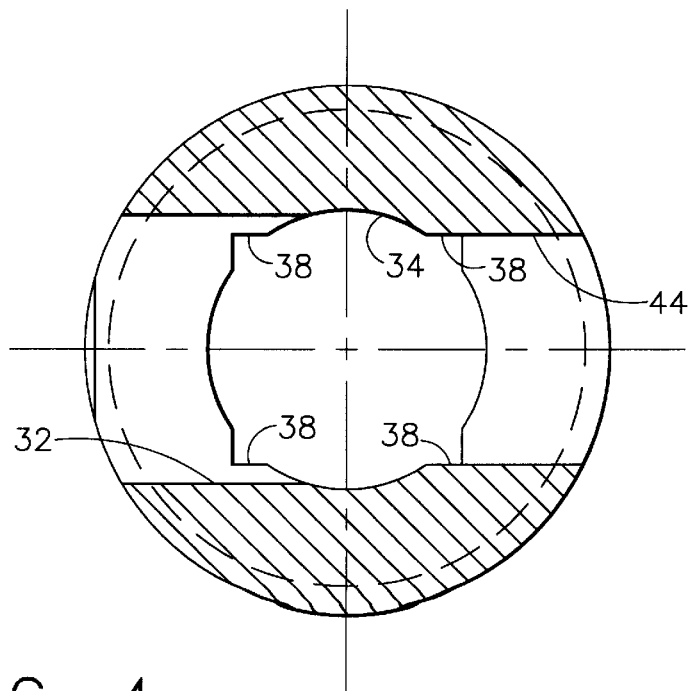
FIG. 4 is a section through line 4—4 of FIG. 2

The thrust surfaces of the bearing for a current production embodiment, as best seen in FIGS. 3a–d, incorporate of plurality of radial grooves 40 which provide improved thrust capacity while enhancing contamination control. For the embodiment shown in the drawings, eight radial grooves at 45° spacing (FIG. 3b) are employed with four of the grooves in alignment with the axial grooves in the bearing bore, as best seen in FIG. 3c. The detail of the V-shape of the grooves employed in this embodiment is shown in FIG. 3d. The grooves are of a 90° V-shape having a depth of between 0.15 and 0.25 mm. A radius at the vertex is provided. A relief 42 on the inner periphery of each thrust surface further enhances oil delivery and distribution. An end view section of the bearing shown in FIG. 4 shows the pin aperture 32 and the lubrication aperture 44.

Figure 5:
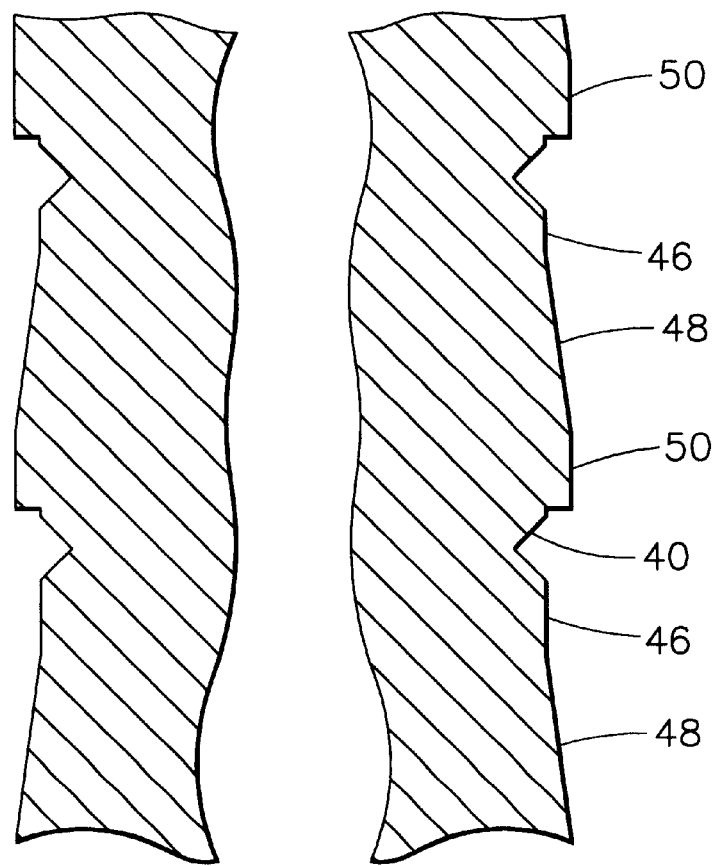
FIG. 5 is a detailed section of the thrust face of the unit, through line 5—5 of FIG. 3b, detailing lands, ramps and flats in the lubrication system.

FIG. 5 shows the contour for both thrust surfaces on the bearing as a section through line 5—5 of FIG. 3b. In the relative direction of rotation of the compressor wheel and turbine wheel with respect to the thrust surfaces, the radial grooves are followed by a lower flat 46 which transitions to a ramp 48 terminating in an upper land 50. For the current production embodiment shown in the drawings, a ramp length of approximately 1.55 mm is employed with a 0.025 to 0.051 mm rise between the lower flat and upper land.

Figure 6:
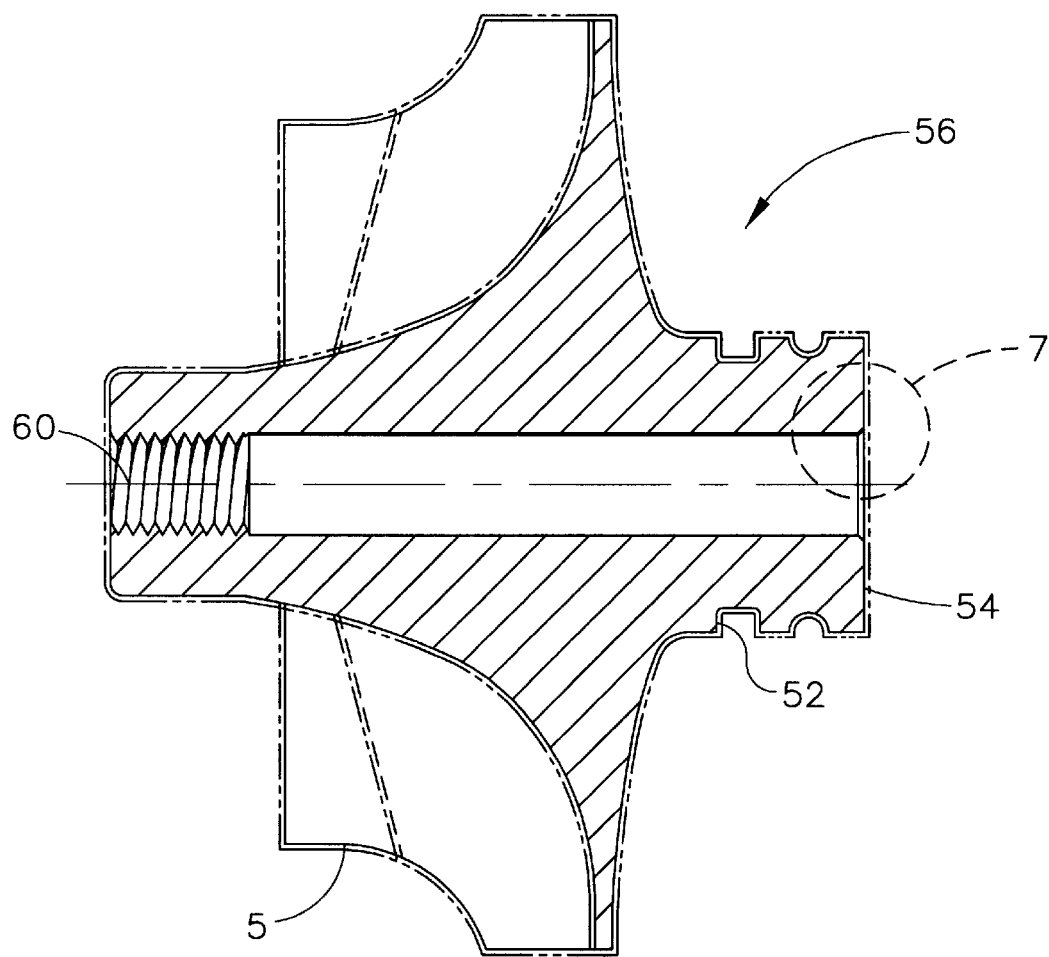
FIG. 6 is a section view of the compressor wheel employed in the invention detailing the oil seal, thrust surface and coating.
Figure 7:
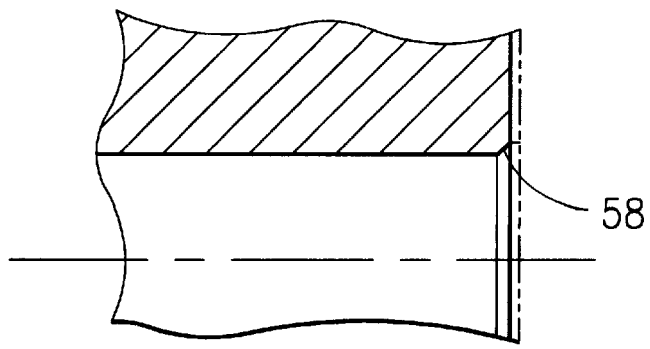
FIG. 7 is a partial section view detail of line 7—7 in FIG. 6.

One thrust surface of the bearing engages a thrust runner on the turbine wheel hub as shown in FIGS. 1a and b. A compressor wheel employed in combination with the bearing described is shown in detail in FIG. 6. The wheel 5 includes a seal ring groove 52 and a thrust surface 54 integrated into the hub 56. Directly incorporating the thrust surface on the wheel hub reduces the number of mating surfaces improving normality and ease of balancing as well as improving heat transfer from the trust surfaces. For the embodiment shown, a hard anodize on the compressor wheel is employed to improve thrust and seal ring wear on the hub. Nituff coating produced by Nimet Industries, Inc. 2424 N. Foundation Drive, South Bend, Ind. has been found to provide a suitable surface. For ease of processing the outer surfaces of the wheel are coated, however, the shaft bore is uncoated. As shown in FIG. 7, a chamfer 58 on the bore exit to the thrust surface is employed for transition of the coating to avoid positive projection of coating build up on the thrust surface due to masking of the bore during processing.

The compressor wheel employed incorporates a threaded portion 60 at the nose of the bore for attachment to shaft 62 which minimizes overhung weight on the bearing. In addition, an overall reduction in overhang distance from the bearing journal to the center of mass of the wheel is provided by the design of the bearing system incorporating present invention. Reduced overhang reduces compressor-end deflection and improves the relative location of the bearing damper.

Figure 1B:
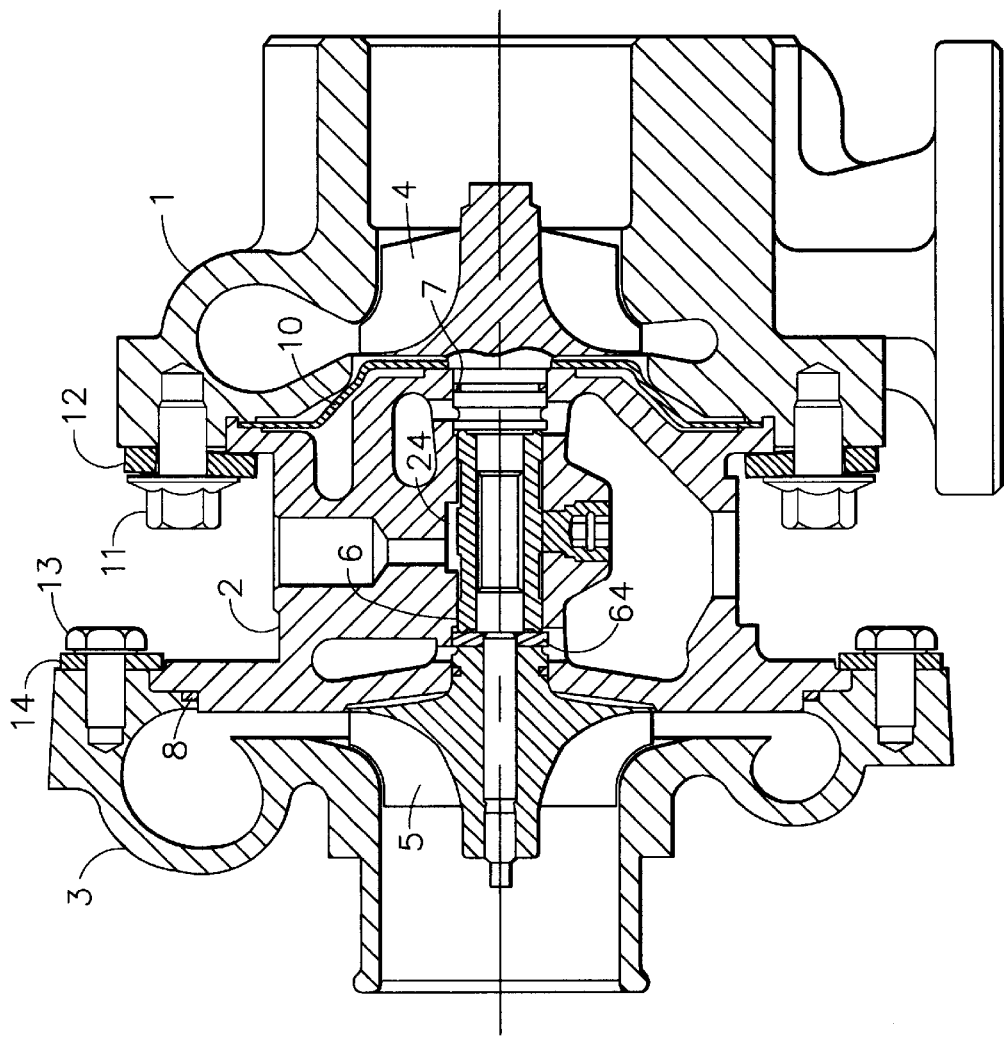
FIG. 1b is a side section view of a turbocharger incorporating a second embodiment of the present invention employing a thrust washer.

A second embodiment of the invention is shown in FIG. 1b wherein a thrust washer 64 is included between the bearing thrust surface and the compressor wheel hub. The washer accommodates thrust loads with higher wear tolerance. Use of a washer as opposed to a conventional thrust collar provides a simple fabrication geometry where required surface finish and parallelism are more easily maintained.

Having now described the invention in detail as required by the patent statutes, those skilled in the art will recognize modifications and substitutions to the specific embodiments disclosed herein. Such modifications and substitutions are within the scope and intent of the present invention as defined in the following claims.

What is claimed is:

1. An integrated bearing system for a turbocharger comprising:

a center housing including a bearing case bore and a boss with an aperture receiving a locating pin extending into the bearing case bore substantially centrally in the bore;

a single piece bearing received in the the bearing case bore and having integral thrust surfaces on opposing ends and integral journal bearing surfaces on portions of the bearing proximate the ends, said bearing further having an internal bore to receive a shaft extending between a compressor wheel and a turbine wheel, the internal bore having a plurality of axial grooves extending between the thrust surfaces and wherein each thrust surface incorporates a plurality of radial grooves extending from the inner bore and wherein the thrust surface is circumferentially profiled with a lower flat substantially adjacent each radial groove transitioning to a ramp terminating in an upper land oppositely adjacent the next radial groove, said bearing having a first aperture substantially equidistant from the ends and engaging the locating pin to prevent rotation of the bearing within the bearing case bore, said bearing being free to symmetrically wobble within the bearing case bore, said bearing further having a second aperture substantially centrally located and in communication with a lubrication oil channel entering the bearing case bore in the center housing; and thrust runners on an end surface of a hub on each of the compressor wheel and turbine wheel, said thrust runners engaging the thrust surfaces of the bearing.

2. An integrated bearing system for a turbocharger as defined in claim 1 wherein the shaft includes a central portion having a reduced diameter to promote lubricant flow in the bearing.

3. An integrated bearing system for a turbocharger as defined in claim 1 wherein the bearing outer diameter is relieved between journal surface portions and a central boss portion which includes the first and second apertures.

4. An integrated bearing system for a turbocharger comprising:

a center housing including a bearing case bore and a boss with an aperture receiving a locating pin extending into the bearing case bore substantially centrally in the bore;

a single piece bearing received in the the bearing case bore and having integral thrust surfaces on opposing ends and integral journal bearing surfaces on portions of the bearing proximate the ends, said bearing further having an internal bore to receive a shaft extending between a compressor wheel and a turbine wheel, the internal bore having a plurality of axial grooves extending between the thrust surfaces and wherein each thrust surface incorporates a plurality of radial grooves extending from the inner bore and wherein the thrust surface is circumferentially profiled with a lower flat substantially adjacent each radial groove transitioning to a ramp terminating in an upper land oppositely adjacent the next radial groove, said bearing having a first aperture substantially equidistant from the ends and engaging the locating pin to prevent rotation of the bearing within the bearing case bore, said bearing being free to symmetrically wobble within the bearing case bore, said bearing further having a second aperture substantially centrally located and in communication with a lubrication oil channel entering the bearing case bore in the center housing;

a thrust washer engaging one of the thrust surfaces on the bearing said thrust washer intermediate the bearing and the compressor wheel; and thrust runners on an end surface of a hub on each of the compressor wheel and turbine wheel, said thrust runners engaging the thrust surfaces of the bearing.

5. An integrated bearing system for a turbocharger as defined in claim 4 wherein the shaft includes a central portion having a reduced diameter to promote lubricant flow in the bearing.

6. An integrated bearing system for a turbocharger as defined in claim 4 wherein the bearing outer diameter is relieved between journal surface portions and a central boss portion which includes the first and second apertures.

7. An integrated bearing system for a turbocharger as defined in claim 1 wherein the compressor wheel incorporates an integral hub having a thrust surface to engage the one of the thrust surfaces on the bearing and further comprising an annodized coating on the hub thrust surface.

8. An integrated bearing system for a turbocharger as defined in claim 7 wherein the anodized coating is Nituff.

* * * * *

UNITED STATES PATENT AND TRADEMARK OFFICE
CERTIFICATE OF CORRECTION

PATENT NO : 6,017,184
DATED : January 25, 2000
INVENTOR(S) : Aguilar et al.

It is certified that error appears in the above-identified patent and that said Letters Patent are hereby corrected as shown below:

Front page, [75], "Sunhil Nandan Sahay" should read Sunil Nandan Sahay

Signed and Sealed this

Third Day of April, 2001

Attest:

NICHOLAS P. GODICI

*Attesting Officer*  *Acting Director of the United States Patent and Trademark Office*